US011635398B2

(12) United States Patent
Benimeli et al.

(10) Patent No.: US 11,635,398 B2
(45) Date of Patent: Apr. 25, 2023

(54) RESISTIVITY MEASUREMENT FOR EVALUATING A FLUID

(71) Applicant: SCHLUMBERGER TECHNOLOGY CORPORATION, Sugar Land, TX (US)

(72) Inventors: Dominique Benimeli, Chatillon (FR); Christian Chouzenoux, Clamart (FR); Yann Dufour, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/320,595

(22) PCT Filed: Oct. 14, 2016

(86) PCT No.: PCT/US2016/056933
§ 371 (c)(1),
(2) Date: Jan. 25, 2019

(87) PCT Pub. No.: WO2018/022123
PCT Pub. Date: Feb. 1, 2018

(65) Prior Publication Data
US 2019/0162067 A1 May 30, 2019

(30) Foreign Application Priority Data

Jul. 27, 2016 (EP) .................................... 16305974

(51) Int. Cl.
*G01N 27/07* (2006.01)
*G01V 3/20* (2006.01)
(Continued)

(52) U.S. Cl.
CPC ............. *G01N 27/07* (2013.01); *E21B 49/08* (2013.01); *E21B 49/0875* (2020.05); *G01N 27/06* (2013.01); *G01V 3/20* (2013.01)

(58) Field of Classification Search
CPC ............................... E21B 49/087; E21B 49/08
See application file for complete search history.

(56) References Cited

U.S. PATENT DOCUMENTS 3,792,347 A * 2/1974 Hawley .................. G01N 27/06
324/427
4,412,180 A * 10/1983 Desbrandes ............. G01V 3/20
324/373

(Continued)

FOREIGN PATENT DOCUMENTS

| WO | 9403802 A1 | 2/1994 |
| WO | 2007034132 A1 | 3/2007 |
| WO | 2011152820 A1 | 12/2011 |

OTHER PUBLICATIONS

International Search Report and Written Opinion of PCT Application No. PCT/US2016/056933 dated Apr. 21, 2017, 16 pages.
(Continued)

*Primary Examiner* — Blake Michener

(57) ABSTRACT

A technique facilitates evaluation of a fluid flowing through a tubing and includes at least one sensor deployed along an interior of the tubing. Each sensor comprises a plurality of electrodes and insulation material disposed between the electrodes to isolate the electrodes from each other and to facilitate resistivity measurements. The plurality of electrodes comprises electrodes for emitting an electric current and for monitoring voltage so as to enable resistivity measurements with respect to fluid flowing through the tubing. The resistivity measurements may be used to determine a constituent fraction, e.g. a water fraction, of the fluid flowing through the tubing.

18 Claims, 4 Drawing Sheets

(51) Int. Cl.
*E21B 49/08* (2006.01)
*G01N 27/06* (2006.01)

(56) References Cited

U.S. PATENT DOCUMENTS

| | | | | |
|---|---|---|---|---|
| 5,959,455 | A * | 9/1999 | Brown | G01N 27/023 |
| | | | | 324/695 |
| 6,776,054 | B1 | 8/2004 | Stephenson et al. | |
| 7,183,778 | B2 * | 2/2007 | Homan | G01V 3/20 |
| | | | | 324/693 |
| 7,201,068 | B2 * | 4/2007 | Foss | G01F 1/74 |
| | | | | 73/861.74 |
| 2003/0011386 | A1 * | 1/2003 | Xie | G01N 22/00 |
| | | | | 324/694 |
| 2004/0012395 | A1 | 1/2004 | Salamitou | |
| 2005/0218898 | A1 * | 10/2005 | Fredette | G01V 3/30 |
| | | | | 324/342 |
| 2008/0156534 | A1 * | 7/2008 | Clark | E21B 47/113 |
| | | | | 175/45 |
| 2011/0100642 | A1 | 5/2011 | Cens et al. | |
| 2012/0041681 | A1 * | 2/2012 | Veneruso | G01N 33/2823 |
| | | | | 702/13 |
| 2012/0111561 | A1 | 5/2012 | Frey et al. | |
| 2012/0293179 | A1 * | 11/2012 | Colombo | G01V 3/26 |
| | | | | 324/339 |
| 2013/0088364 | A1 * | 4/2013 | Bittar | B23P 15/28 |
| | | | | 340/856.3 |
| 2013/0106421 | A1 * | 5/2013 | Dubourg | E21B 47/085 |
| | | | | 324/355 |
| 2013/0158875 | A1 | 6/2013 | Brown | |
| 2013/0258319 | A1 * | 10/2013 | Schleicher | G01R 1/06711 |
| | | | | 356/72 |
| 2015/0168582 | A1 * | 6/2015 | Zhang | E21B 49/08 |
| | | | | 324/324 |

OTHER PUBLICATIONS

International Preliminary Report on Patentability of PCT Application No. PCT/US2016/056933 dated Feb. 7, 2019, 13 pages.

* cited by examiner

RESISTIVITY MEASUREMENT FOR EVALUATING A FLUID

BACKGROUND

Field

The present disclosure relates to techniques for measuring multiphase flows in wellbores. More particularly, the present disclosure relates to tools and methods for intelligent completions and monitoring systems, including monitoring multiphase fluid flow in wellbores.

Description of the Related Art

In many hydrocarbon well applications, a wellbore is drilled into a desired hydrocarbon-bearing formation. The wellbore is then completed and hydrocarbon fluids are produced from the formation. In some applications, the hydrocarbon fluids may incur an influx of water and the fraction of water may increase during the life of the well. Various sensors and techniques have been used to determine the water volume fraction so that remedial actions may be taken to slow the incursion of water or to reduce the water fraction in the hydrocarbon fluids. For example, capacitive sensors have been used in monitoring applications but such sensors may not be useful when the water-cut exceeds a certain level. In some applications, toroid transformers have been mounted around tubing through which the hydrocarbon fluid flows to determine the water volume fraction, but such techniques utilize tubing formed of a non-conductive material. The non-conductive material, however, may be problematic in certain types of environments and may have limited pressure containment capability.

SUMMARY

In general, a methodology and system provide at least one sensor deployed along an interior of a tubing, such as a production tubing in a well string. Each sensor may comprise a plurality of electrodes with insulation material disposed around each electrode to isolate the electrodes from each other and to thus facilitate resistivity measurements. The plurality of electrodes comprises electrodes for emitting an electric current and for monitoring voltage so as to enable resistivity measurements with respect to fluid flowing through the tubing. The resistivity measurements may be used to determine a constituent fraction, e.g. a water fraction, of the fluid flowing through the tubing.

However, many modifications are possible without materially departing from the teachings of this disclosure. Accordingly, such modifications are intended to be included within the scope of this disclosure as defined in the claims.

BRIEF DESCRIPTION OF THE DRAWINGS

So that the manner in which the above recited features can be understood in detail, a more particular description may be had by reference to embodiments, some of which are illustrated in the appended drawings, wherein like reference numerals denote like elements. It is to be noted, however, that the appended drawings illustrate various embodiments and are therefore not to be considered limiting of its scope, and may admit to other equally effective embodiments.

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
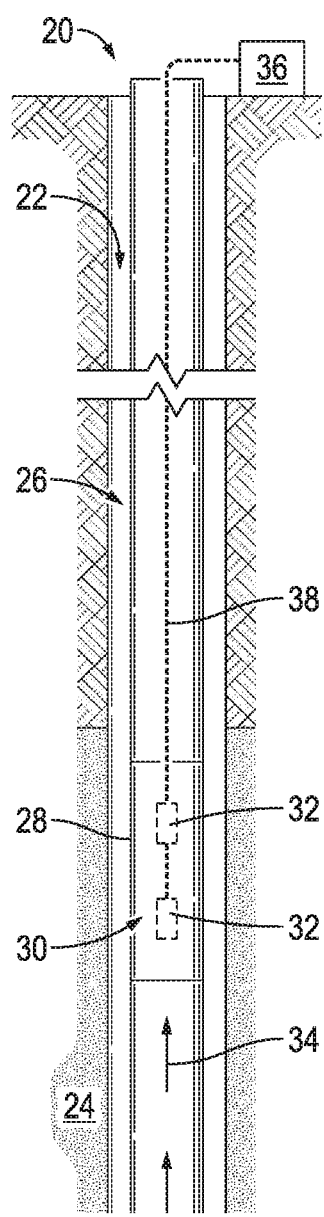
FIG. 1 is a schematic view of an example of a well system comprising a well string with a tubing having at least one sensor deployed along an interior of the tubing for determining a desired constituent fraction with respect to fluid flowing through the tubing, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the disclosure.

With respect to certain embodiments of the present disclosure, a methodology and system are provided to facilitate evaluation of a fluid flowing through a tubing. At least one sensor is deployed along an interior of the tubing and each sensor may comprises a plurality of electrodes and insulation material disposed between the electrodes to isolate each electrode with respect to the other electrodes. The electrodes and the insulation are arranged to facilitate resistivity measurements. For example, the plurality of electrodes may comprise electrodes for emitting an electric current and for monitoring voltage so as to enable resistivity measurements with respect to fluid flowing through the tubing. The resistivity measurements may be used to determine a constituent fraction, e.g. a water fraction, of the fluid flowing through the tubing.

By way of example, embodiments described herein may be used to enable resistivity measurement techniques for water fraction determination in permanent monitoring applications. In well applications, the techniques may be based on resistivity measurements to determine water fraction level in a hydrocarbon-based fluid having a multiphase mixture of fluid constituents with a conductive phase. According to an embodiment, the technique utilizes a sensor instrument having a set of electrodes and insulating material placed along an inner wall of a tubing through which the fluid, e.g. hydrocarbon fluid, flows. The sensor instrument is useful in determining a desired constituent of the fluid, such as a water fraction in a water-hydrocarbon fluid or a water-hydrocarbon-gas fluid. As described in greater detail below, the techniques also may be used to enhance focusing of electric current by the sensor instrument and to minimize electrode impedance effects.

According to an example, a configuration of electrodes locates the electrodes inside a tubing along an inner wall of the tubing. Consequently, the tubing may be constructed of a strong, metal material, such as stainless steel, having an insulated layer, e.g. coating, on an inner wall of the metal material. Examples of materials which may be used to form the insulation layer include Teflon™ or ceramic deposit. The ability to use a strong material such as stainless steel ensures that the pressure integrity of the tubing is maintained during the well fluid production operation or other operation. In various well applications, the sensor or sensors of the sensor instrumentation enables performance of water fraction measurement in water continuous phase situations by making use of resistivity techniques compatible with downhole environments. Additionally, the sensors are readily miniaturized to a size attractive for deployment in producing wells.

Referring generally to FIG. 1, an example of a well system 20 is illustrated in which embodiments described herein may be employed. The well system 20 may be an onshore or offshore system comprising a borehole 22 formed in a subsurface formation 24 by drilling. Once the borehole 22 is formed, a well string 26, e.g. completion string, is deployed downhole in the borehole 22 to facilitate a hydrocarbon-based well fluid production operation.

In the illustrated example, the well string 26 comprises a section of tubing 28 which may be a section of production tubing. Sensor instrumentation 30 is positioned along an interior surface of the tubing 28 and may comprise at least one sensor 32 with associated electrical circuitry. The sensor or sensors 32 may be used to obtain resistivity measurements with respect to a fluid 34, e.g. a hydrocarbon-based fluid, which flows along an interior of the tubing 28. The tube 28 may be formed from a metal material, such as stainless steel, which provides a strong structure able to maintain its integrity even under high pressures that may be experienced during various downhole applications.

In a well fluid production operation, the fluid 34 flowing along the interior of tubing 28 may comprise a hydrocarbon-based fluid received into borehole 22 from formation 24 and then produced to a surface collection location. The sensor or sensors 32 may be operatively coupled with a monitoring and control system 36 via a communication line 38 which may utilize hardwired and/or wireless telemetry techniques for relaying data from sensors 32 to the monitoring and control system 36. The monitoring and control system 36 may be located in whole or in part at a surface location, a downhole location, and/or a location remote from the wellsite.

Figure 2:
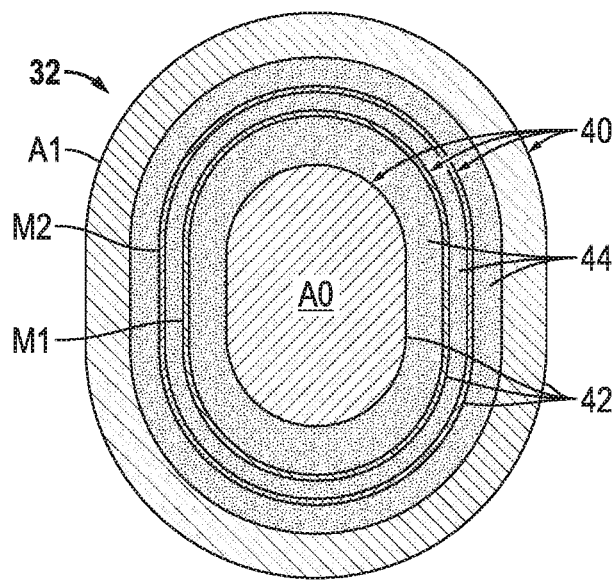
FIG. 2 is a schematic illustration of an example of a sensor, according to an embodiment of the disclosure.

Referring generally to FIG. 2, an embodiment of sensor 32 is illustrated. In this embodiment, the sensor 32 is constructed as a miniaturized resistivity button type sensor equipped with a set of electrodes 40 located for contact with fluid 34 as it flows through the interior of tubing 28. In this example, the configuration of the electrodes 40 is based on a micro laterolog principle.

The embodiment of FIG. 2 illustrates sensor 32 equipped with the plurality of the electrodes 40 in the form of four ring electrodes 42 separated by insulating material 44. In some applications, the insulating material 44 also acts as a pressure barrier against fluid ingress so that the other side of the button sensor 32 can be connected to a downhole electronic circuit of sensor instrumentation 30. In this example, two of the ring electrodes 42 are labeled as electrodes A0 and A1, respectively, and designate measurement and guard current electrodes. Additionally, two of the ring electrodes 42 are labeled as electrodes M1 and M2, respectively, and designate monitoring electrodes. The tubing 28, e.g. steel tubing, may be used as an electrical ground for current return. By way of example, the working frequency for current injection and voltage monitoring via electrodes 42 is on the order of one or a few kHz. It should be noted that although four ring electrodes 42 are illustrated, other numbers of electrodes 42 (including other numbers of measurement/guard current electrodes and monitoring electrodes) may be utilized in some applications.

To provide a focusing effect of electric current emitted by the central ring electrode A0, the electric currents from the guard and measurement electrodes A0, A1 are dynamically adjusted to keep both monitoring electrodes M1, M2 at substantially the same potential $V_M$ which is also the measurement voltage. The resistivity of fluid mixture 34 is given by:

$$Rm = k\frac{V_M}{I_0}$$

where $I_o$ is the current through electrode A0 and k is a geometrical factor.

The use of separate electrodes 40 to inject current (A0, A1) and sense voltage (M1, M2) eliminates or substantially removes the contact impedance issue. In this embodiment, the resistivity button style sensor 32 and its electrodes 40 are deployed along the interior of the tube 28 so that the electrodes 40 are in close contact with the fluid 34. Depending on the application, the electrodes 40 may be slightly intrusive into the interior of tube 28 or they may be flush with an interior surface of the tube 28 to reduce erosion effects during long term exposure to flowing fluid 34.

Figure 3:
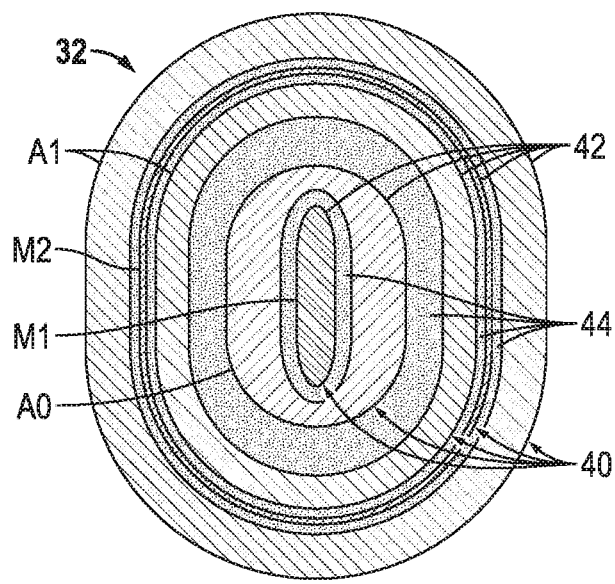
FIG. 3 is a schematic illustration of another example of a sensor, according to an embodiment of the disclosure.

Referring generally to FIG. 3, another embodiment of sensor 32 is illustrated. In this embodiment, the electrodes 40 of sensor 32 are again placed in a micro-laterolog button configuration. The electrodes 40 are again formed as ring electrodes 42 in which the ring electrodes 42 are sequentially larger moving from an inner location to an outer location of the sensor 32 (as with the embodiment illustrated in FIG. 2). However, the monitoring electrodes M1 and M2 of electrodes 40 are embedded in the current emitting electrodes A0 and A1, respectively.

In some applications, the sensor 32 may be constructed as a micro-laterolog button style sensor with enhanced focusing. This construction and technique may be used to reduce the effects of the presence of tubing 28 when tubing 28 is formed of steel. While reducing effects related to the presence of steel tube 28 on the data measured by sensor 32, the technique also increases the useful investigation distance of measurements taken by sensor 32 with respect to fluid flowing through the tubing 28 and the past the sensor 32.

Figure 4:
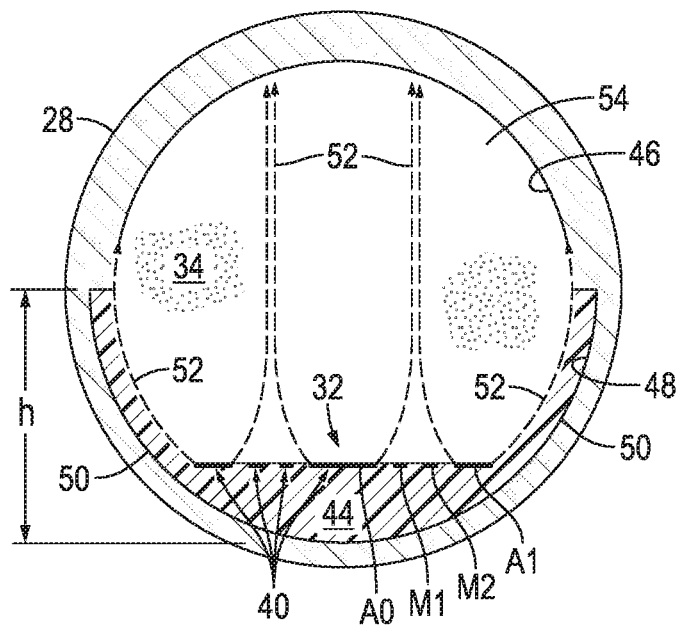
FIG. 4 is a schematic cross-sectional illustration of a tubing with a sensor disposed along an interior surface of the tubing, according to an embodiment of the disclosure.
Figure 5:
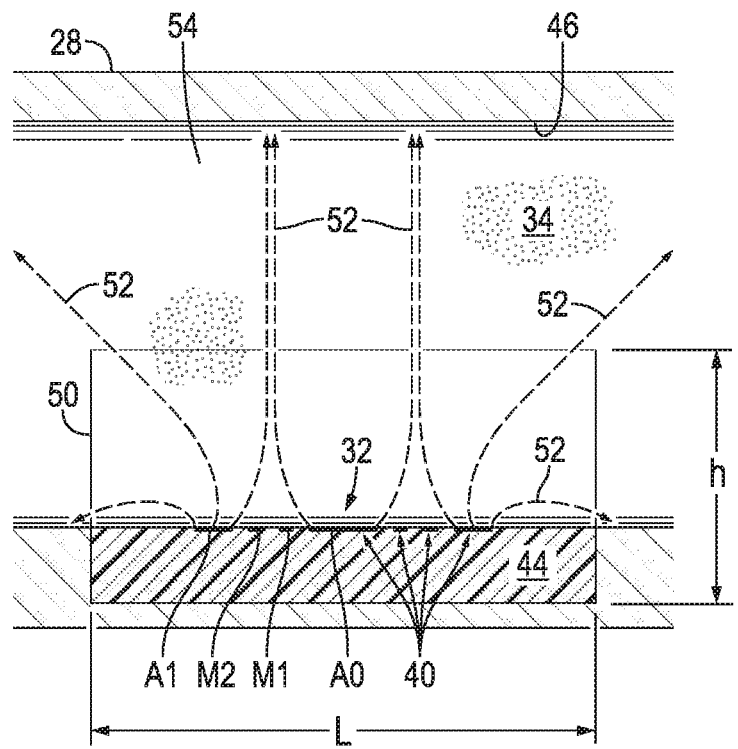
FIG. 5 is a schematic cross-sectional illustration similar to that of FIG. 4 but taken longitudinally along the tubing, according to an embodiment of the disclosure.

An example implementing this type of technique is illustrated by the axial cross-section of FIG. 4 and the longitudinal cross-section of FIG. 5. As illustrated, the electrical insulation 44 is positioned along an inner wall 46 of tubing 28 and serves to electrically isolate electrodes 40. The insulation 44 also may be positioned between electrodes 40 and a surrounding section 48 of tubing 28. In some applications, the insulation 44 also may comprise insulating sleeve sections 50, e.g. insulating skirts, which extend along a portion of the internal circumference of tubing 28 to provide passive additional focusing of the electric current emitted by certain electrodes 40. The insulating sleeve sections 50 may be constructed to rise along the inner wall 46 of tubing 28 over a height h, as illustrated, while also extending longitudinally beyond the electrodes 40 over a total length L (see FIG. 5).

In some embodiments, the insulation 44 may be constructed in the form of half a cylindrical sleeve slid inside tubing 28 adjacent to a radially inner surrounding section 48 of tubing 28. By way of example, the insulation may be formed from a ceramic material, from a polyetheretherketone (PEEK) material, or from another suitable insulating material and the surrounding tubing 28 may be formed of a suitable metal material, e.g. stainless steel, and grounded. The insulation 44 may be formed as a separate subassembly which is combined with the metal structure portion of tubing 28. The insulation 44 also may comprise grooves for receiving wiring from the electrodes 40 and routed to a corresponding connector of sensor instrumentation 30.

As further illustrated, the structure of electrodes 40 and insulation 44 focuses the current lines 52 within tubing 28. The enhanced focusing enables improved detection of water phase in the fluid 34 flowing along an interior 54 of tubing 28. As described above, certain electrodes 40, e.g. electrodes labeled as A0 and A1, may be used to emit electric current and to inject the current into the fluid flowing along interior 54. These currents may then be dynamically adjusted via, for example, monitoring and control system 36, to maintain both monitoring electrodes M1 and M2 of electrodes 40 at the same potential $V_M$ which also is the measurement voltage. This measurement voltage data is then processed according to available algorithms or models via, for example, monitoring and control system 36 to determine the volume water fraction within the fluid 34.

Figure 6:
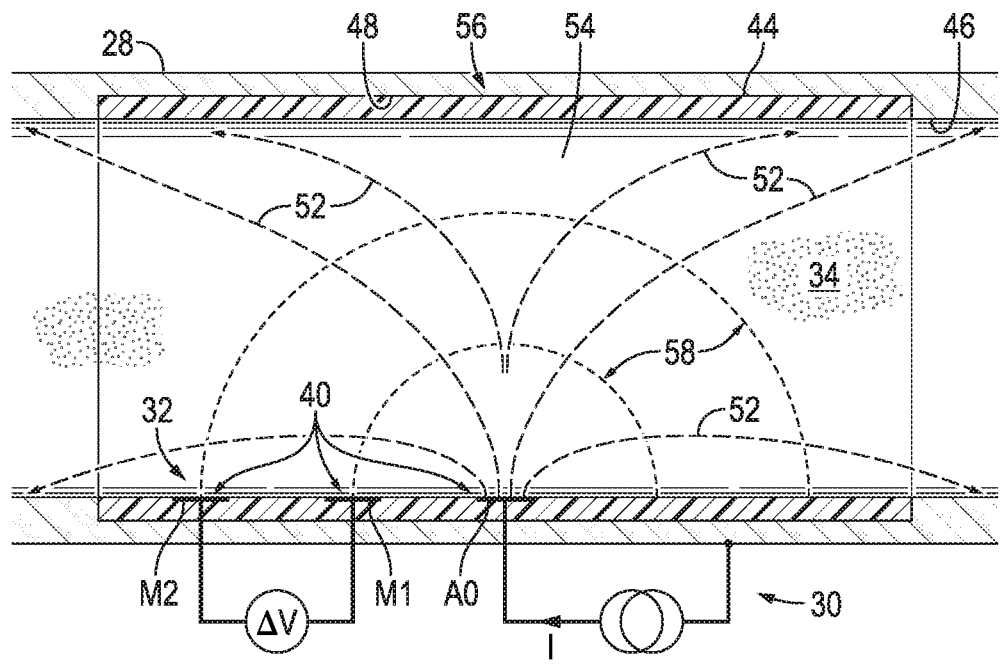
FIG. 6 is a schematic cross-sectional illustration demonstrating a principle for determining water volume fraction via fluid mixture resistivity, according to an embodiment of the disclosure.

Referring generally to FIG. 6, a related technique is illustrated as operating according to the principle of a micro log cylindrical sub. Inside the steel section of tube 28, insulation 44 is formed as a cylindrical insulating sleeve 56 equipped with a plurality of the electrodes 40 which may be arranged generally longitudinally along a length of tubing 28 to form sensor 32. The electrodes 40, which in some embodiments may be button of single point electrodes, are again isolated from each other by insulation 44. In some applications, the cylindrical insulating sleeve 56 may be positioned within a corresponding recess formed along the interior of the steel portion of tubing 28. For example, the insulating sleeve 56 may be surrounded by a radially thinner, metal section 48 of tubing 28 which extends along the circumference of tubing 28.

The length of sensor 32 and the longitudinal span of electrodes 40 is selected to allow transversal spreading of current emitted by electrode A0 before it returns to the walls of tubing 28 (see current lines 52 and equipotential surfaces 58). The spacing between the electrodes 40 establishes the range and depth of investigation. Again, voltage measurement and current injection are separate, as with the other embodiments described herein, so that contact impedance does not become an issue as long as the voltage difference is sufficient. Wiring for the electrodes 40 can again be routed through the insulation or along another suitable path and coupled with an appropriate connector of sensor instrumentation 30.

Figure 7:
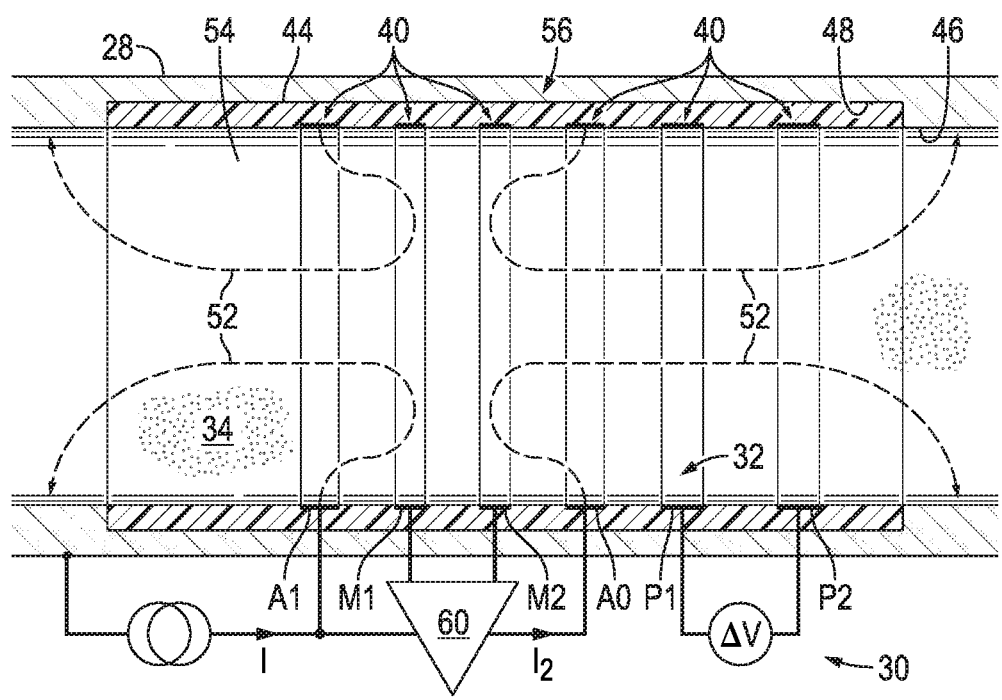
FIG. 7 is a schematic cross-sectional illustration also demonstrating a principle for determining water volume fraction via fluid mixture resistivity, according to an embodiment of the disclosure.

Referring generally to FIG. 7, another embodiment is illustrated which utilizes a principle of the longitudinal log tool. In this example, the insulating sleeve 56 is formed of insulation 44 and is again positioned within the surrounding metal section 48 of tubing 28. The electrodes 40 are electrically isolated in insulation 44 and may be formed as a plurality of ring electrodes 42. The use of ring electrodes 42 makes the resistivity measurement related to the presence of a monitored constituent, e.g. water, insensitive to the orientation of tubing 28.

In the embodiment illustrated, six electrodes 40 are located along the inner wall 46 of the tube 28. By way of example, the electrodes 40 in this embodiment may be ring electrodes of the type which extend around the circumference of insulating cylindrical sleeve 56. Current is injected on electrodes A1 and A0. A monitoring amplifier 60 dynamically diverts current 12 flowing from A0 to keep M1 and M2 monitoring electrodes at the same potential. This results in zero current flowing across the monitoring electrodes M1, M2 and the current 12 flows in front of the electrodes labeled P1 and P2 down to the steel tube 28 (current return). The mixture resistivity is then calculated by dividing the voltage drop across electrodes P1 and P2 by 12 and multiplying the result by the K geometrical factor.

The configuration illustrated in FIG. 7 establishes a longitudinal log tool which fits the problem cylindrical geometry and provides independence relative to tube axis orientation. As with other embodiments, the electrodes 40 may be wired to a single end connector of the sensor instrumentation 30. It should be noted if the monitoring amplifier 60 and the corresponding ring electrodes M1, M2 and A1 are suppressed, the concept is similar to the version described above with reference to FIG. 6. However, the use of the six electrodes 40 may provide improved monitoring and may increase the accuracy of the measurements in at least some applications. In some embodiments, less than six electrodes 40 may be used as well, such as four electrodes 40 or three electrodes 40. The three electrode configuration may include an injection electrode A0 and two measurement electrodes M1 and M2.

Figure 8:
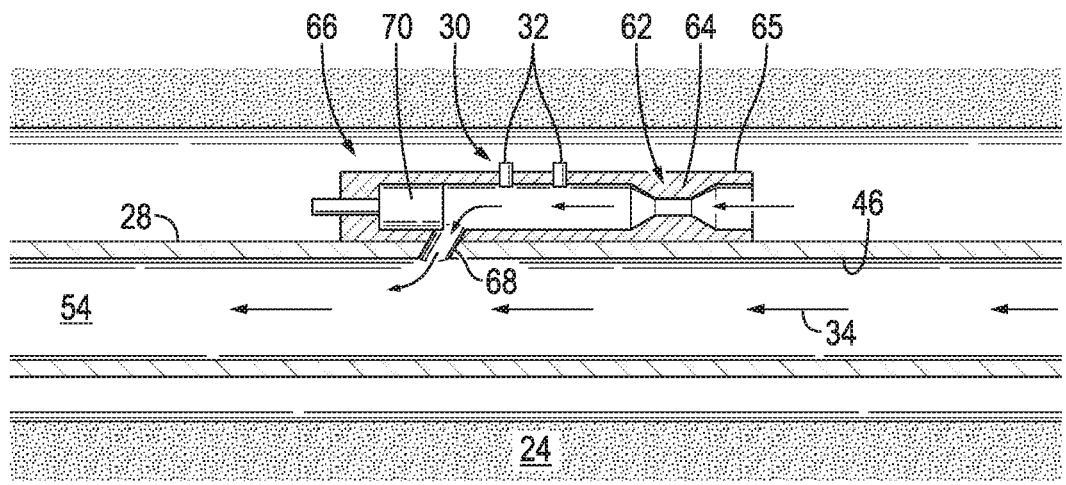
FIG. 8 is a schematic illustration of an example of a well string having a production tubing with an embodiment of a sensor and an embodiment of a flow control system for controlling flow of well fluid into the tubing based on data obtained from the sensor, according to an embodiment of the disclosure.

In some embodiments, the sensor instrumentation 30 for determining water fraction may be combined with a flow mixing device 62, as illustrated in FIG. 8. By way of example, the mixing device 62 may comprise a Venturi restriction 64. In well applications, for example, the fluid mixing device 62 may be used to avoid fluid stratification by dispersing oil phase in water in the form of small droplets. This type of mixing can be very effective above certain flow rates based on the oil viscosity and geometry of the mixing device 62. The mixing device 62 also ensures that the oil phase and water phase propagate at the same velocity at a given position of the sensor 32. By way of example, the mixing device 62 and sensor(s) 32 may be mounted along an instrumented tube 65 coupled to tubing 28.

In some applications, the sensor instrumentation 30, including any of the various configurations of sensor(s) 32, also may be combined with a flow control system 66 which may be used to control flow of fluid 34, e.g. well fluid, from a region external to tubing 28 and into the interior 54 of tubing 28. By way of example, the flow control system 66 may control the flow of fluid 34 from this exterior region to the interior 54 via a lateral opening or openings 68 positioned through a sidewall of tubing 28. The flow control system 66 may be controlled via monitoring and control system 36 in response to data provided by sensor(s) 32, where the sensor(s) 32 may be positioned along a tubing portion of the flow control system 66 or along tubing 28. If, for example, the water content in the inflowing fluid becomes greater than a certain predetermined level, the flow control system 66 may be actuated to partially or fully close off the opening or openings 68. In some applications, the monitoring and control system 36 may be a computer type control system programmed to automatically adjust the amount of flow through openings 68 in response to data from sensors 32. Depending on the application, the flow control system 66 may comprise a choke 70 or another suitable type of flow controller. In some embodiments, the sensor or sensors 32 are installed in instrumented tube 65 upstream of the flow control choke 70 to monitor the water fraction prior to entry of fluid 34 into main production tubing 28.

In an operational example, the sensor or sensors 32 may be utilized in applications where the water in fluid 34 is the continuous phase of the fluid mixture 34. The sensor configuration ensures sensors 32 can be effective above a given water fraction threshold. In this example, an electrical path is created between the electrodes 40 and the fluid impedance is mainly resistive.

In the case of water being the continuous phase with oil and water phases being properly mixed, the measured fluid mixture resistivity $R_m$ can be expressed as a function of the water resistivity $R_w$ and water fraction $\alpha_w$ with the use of a suitable theoretical formulation such as the Ramu-Rao formula:

$$R_m = R_w \frac{3 - \alpha_w}{2\alpha_w}$$

where the water fraction parameter varies between 0 and 1.

Oil conductivity is substantially lower as compared to water conductivity, which is the case for most downhole reservoir fluids. In some applications, the water conductivity may be evaluated separately, e.g. through surface sampling, logging, or another suitable technique. The water conductivity may be mainly dependent upon water salinity and temperature. In some applications, the water conductivity $R_w$ can be in-situ compensated for temperature. In such applications, the fluid temperature may be measured with an additional temperature sensor positioned in sensor instrumentation 30 or at another appropriate location.

Figure 9:
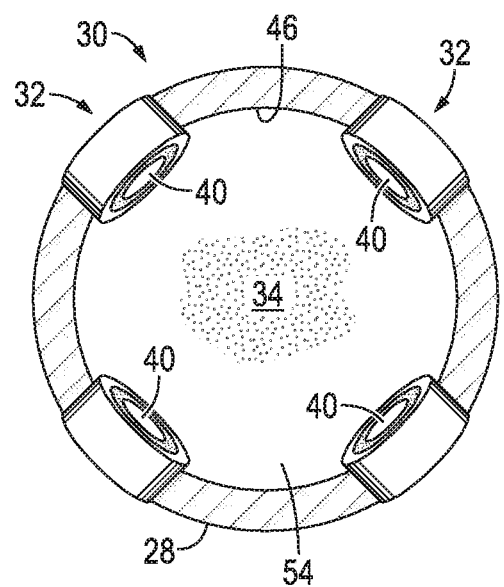
FIG. 9 is a schematic cross-sectional illustration of a tubing with at least one sensor disposed along an interior surface of the tubing, according to an embodiment of the disclosure.
Figure 10:
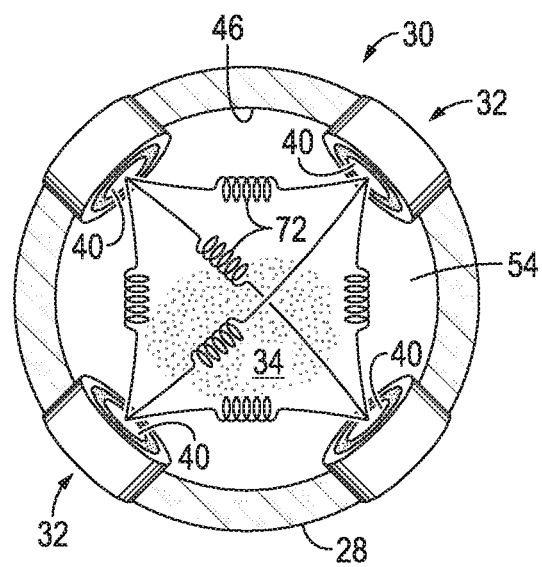
FIG. 10 is a schematic cross-sectional illustration of a tubing with at least one sensor disposed along an interior surface of the tubing, according to an embodiment of the disclosure.

Referring generally to FIGS. 9 and 10, additional embodiments of sensor instrumentation 30 are provided in which a sensor or sensors 32 are positioned circumferentially along the interior of tubing 28. In the embodiment illustrated in FIG. 9, the sensor(s) 32 comprises separately mounted electrodes 40 which may be selectively dedicated to current injection or voltage monitoring. As a result an electrical map of the fluid section can be constructed. Additionally, the annular array of N electrodes 40 in combination with calculation of the resistivity between pairs of electrodes 40 of the array enables a map to be drawn regarding the fluid resistivity along the cross-section.

In the embodiment illustrated in FIG. 10, the electrodes 40 of sensor(s) 32 are again arranged in a circular configuration and a schematic representation is provided of equivalent fluid impedances 72 between electrodes 40. In this example, the annular array of N electrodes 40 enables calculation of an impedance map of the fluid section.

The methodology comprises injecting a current from one electrode 40 with return on the other electrodes 40. The electrodes 40 are scanned in a sequential manner and the relative voltage levels between electrodes 40 are measured. From these measurements, a resistivity map of the fluid cross-section can be obtained via inversion algorithms. For example, algorithms used for electrical tomography may be employed to construct the resistivity map. If the voltage measurement performed by, for example, measurement and control system 36 and/or embedded electronics, is made phase sensitive, the in-phase and quadrature phase components relative to the current excitation are acquired. In this case, an impedance map can be obtained (resistive and capacitance map) by a suitable inversion algorithm.

It should be noted the methodologies and systems described herein may be used to determine the presence and fraction of a variety of desired constituents of various fluids. In many well applications, the constituent of interest is water, and the embodiments described herein may be used to determine water fraction in produced hydrocarbon-based fluids. However, the embodiments also may be used in a variety of surface applications and non-hydrocarbon fluid type applications.

Additionally, the well string 26 may comprise a variety of components and configurations. The well string 26 also may be deployed in a variety of vertical and/or deviated, e.g. horizontal, wellbores. Similarly, the sensor instrumentation 30 may comprise various numbers of sensors 32/electrodes 40 in various configurations and arrangements. The sensor instrumentation 30 also may be combined with a variety of other features, such as various fluid mixing devices and flow control devices. Furthermore, the sensor instrumentation 30 may comprise various types of connectors, electronics, processors, and/or other components which may be mounted on a printed circuit board or mounted according to other suitable techniques. Depending on the application, the monitoring and control system 36 may be located downhole, at the surface, or at both downhole and surface locations.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. A method for determining a constituent of a fluid, comprising:
   providing a resistivity sensor with a plurality of ring electrodes separated by insulation, the plurality of electrodes comprising current emitting electrodes and monitoring electrodes, wherein the ring electrodes are sequentially larger from an inner location to an outer location of the sensor;
   using at least one current emitting electrode to inject an electric current into a fluid proximate the sensor;
   dynamically adjusting the electric current injected into the fluid to maintain the monitoring electrodes at the same voltage;
   operating the sensor along an inside wall of a tubing as the fluid passes through the tubing; and
   determining a water fraction in the fluid passing through the tubing by controlling and monitoring the electric currents injected and the voltages sensed via the plurality of electrodes, wherein water in the fluid is the continuous phase of the fluid.

2. The method as recited in claim 1, wherein the tubing comprises a production tubing of a downhole well string.

3. The method as recited in claim 1, further comprising controlling a flow of the fluid into the tubing based on data obtained from the sensor.

4. The method as recited in claim 1, wherein operating the sensor comprises measuring resistivity.

5. The method as recited in claim 1, further comprising forming the tubing with stainless steel and locating a layer of insulation along the inside wall of the tubing.

6. The method as recited in claim 1, wherein providing comprises providing the sensor with four ring electrodes.

7. The method as recited in claim 1, wherein providing comprises providing the sensor with electrodes of the plurality of electrodes positioned longitudinally along the tubing.

8. The method as recited in claim 1, further comprising injecting current from two electrodes and measuring voltage via two of the monitoring electrodes.

9. A method, comprising:
   deploying a plurality of ring electrodes separated by insulation along an inner wall of a tubing, the tubing comprising stainless steel;
   flowing a fluid through the tubing;
   obtaining resistivity measurements of the fluid flowing through the tubing by injecting current into the fluid and monitoring voltage via electrodes of the plurality of electrodes, while adjusting the current injected into the fluid to maintain monitoring electrodes of the plurality of electrodes at the same voltage; and
   determining a water fraction in the fluid via the resistivity measurements, wherein water in the fluid is the continuous phase of the fluid.

10. The method as recited in claim 9, wherein the tubing comprises a production tubing in a well string.

11. The method as recited in claim 9, wherein deploying comprises deploying electrodes of the plurality of electrodes as ring electrodes.

12. The method as recited in claim 9, wherein deploying comprises deploying electrodes of the plurality of electrodes sequentially along a length of the tubing.

13. The method as recited in claim 9, wherein deploying comprises deploying at least two electrodes for injecting current and at least two electrodes for monitoring voltage.

14. The method as recited in claim 9, wherein flowing the fluid comprises flowing a well fluid comprising a hydrocarbon.

15. The method as recited in claim 14, further comprising using a flow mixing device to mix the fluid as it flows along the tubing.

16. The method as recited in claim 14, further comprising employing a flow control system to adjust flow of the fluid into the tubing based on data related to determining the water fraction.

17. A system for determining water fraction, comprising:
   a well string having a production tubing;
   a resistivity sensor deployed along an inner wall of the production tubing and configured to obtain resistivity measurements of fluid flowing through the production tubing, the sensor comprising:
      a plurality of ring electrodes separated by insulation, the plurality of electrodes including electrodes for emitting electric current and electrodes for monitoring voltage, wherein the ring electrodes are sequentially larger from an inner location to an outer location of the sensor; and
      insulation disposed to electrically isolate each electrode of the plurality of electrodes from the other electrodes of the plurality of electrodes, and insulation positioned radially and axially between the sensor and the inner wall of the production tubing;
   a monitoring and control system; and
   a communication line configured to relay data from the sensor to the monitoring and control system, the monitoring and control system configured to determine a water fraction in the fluid via the resistivity measurements.

18. The system as recited in claim 17, further comprising a flow control system operatively coupled with the sensor to control an amount of fluid entering the production tubing based on data from the sensor.

* * * * *